United States Patent [19]

Honig

[11] 3,929,688

[45] Dec. 30, 1975

[54] BIS(2,3-DIBROMOPROPYL)PHOSPHATE AS A FLAME RETARDANT FOR POLYMERS

[75] Inventor: Milton L. Honig, New York, N.Y.

[73] Assignee: Stauffer Chemical Company, Westport, Conn.

[22] Filed: Apr. 25, 1974

[21] Appl. No.: 463,949

Related U.S. Application Data

[60] Division of Ser. No. 242,146, April 7, 1972, and a continuation-in-part of Ser. No. 145,553, May 20, 1971, abandoned.

[52] U.S. Cl. ... 260/2.5 AJ; 260/45.7 P; 260/77.5 SS
[51] Int. Cl.² ............................................. C08K 5/53
[58] Field of Search ..... 260/2.5 AJ, 77.5 SS, 45.7 P

[56] References Cited
UNITED STATES PATENTS

| | | | |
|---|---|---|---|
| 3,400,085 | 9/1968 | Kujawa | 260/2.5 AJ |
| 3,412,070 | 11/1968 | Jakob | 260/961 |
| 3,737,397 | 6/1973 | Baranauckas | 260/2.5 AJ |

OTHER PUBLICATIONS

Lyons, *The Chemistry and Uses of Fire Retardants*, Wiley–Interscience, N.Y. 1970; pp. 305–312.

*Primary Examiner*—Donald E. Czaja
*Assistant Examiner*—C. Warren Ivy

[57] ABSTRACT

There are disclosed the novel bis(2,3-dibromopropyl) phosphonates as well as various processes for their preparation. These compounds are found to display excellent flame retardant properties when utilized as additives in a variety of flammable substrates, particularly synthetic resins and foams.

8 Claims, No Drawings

BIS(2,3-DIBROMOPROPYL)PHOSPHATE AS A FLAME RETARDANT FOR POLYMERS

CROSS-REFERENCE TO RELATED APPLICATION

This is a division of application Ser. No. 242,146, filed Apr. 7, 1972, and a continuation-in-part of copending U.S. application Ser. No. 145,553, filed May 20, 1971, now abandoned.

TECHNICAL DISCLOSURE OF THE INVENTION

The present invention comprises the bis(2,3-dibromopropyl) phosphonates corresponding to the formula

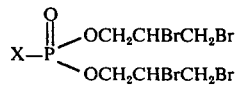

where X is a radical selected from the group consisting of phenyl and Y—CH$_2$— radicals wherein Y is a halo radical selected from the group consisting of chloro and bromo radicals, as well as methods for their preparation. The novel compounds of this invention are therefore:

Bis(2,3-dibromopropyl) chloromethylphosphonate,
Bis(2,3-dibromopropyl) bromomethylphosphonate and
Bis(2,3-dibromopropyl) phenylphosphonate.

These compounds, which are new compositions of matter, have been found to impart excellent flame retardant properties to a large number of otherwise flammable substrates including, for example, urethane foams and the so-called polyester resins resulting from the reaction between dibasic acids and dihydric alcohols. From the above listed group of compounds, bis(2,3-dibromopropyl) chloromethylphosphonate is preferred with respect to both the ease and cost of its preparation as well as the results obtained upon using it as a flame retardant for synthetic resins and foams. It is to be noted that the use, in this disclosure, of the term "halo" is meant to refer to both chloro and bromo radicals. Moreover, it will be understood by those skilled in the art that the phenyl group in bis(2,3-dibromopropyl) phenylphosphonate may, if desired, be substituted with one or more non-interfering substituent groups, i.e., groups whose presence will not interfere with the use of this compound as a fire retardant additive. Such non-interfering groups include, but are not limited to, halo, nitro, alkyl, hydroxyalkyl, sulfonate, carboxyl and hydroxyl radicals.

In preparing the novel compounds of this invention, there are two synthetic routes which may be utilized. These synthetic routes are described in the following equations:

Route No. 1

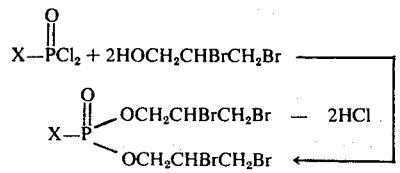

Route No. 2

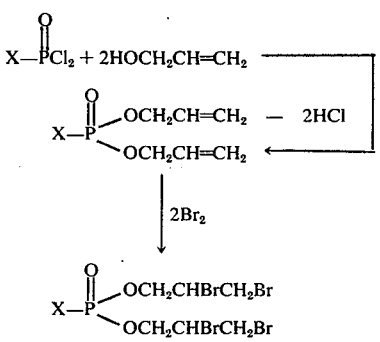

where X is as defined above.

In conducting the process outlined, hereinabove, in the equation set forth for synthetic route No. 1, either a halomethylphosphonic dichloride, or phenylphosphonic dichloride, is reacted with double its concentration, on a molar basis of 2,3-dibromopropanol. This reaction is conducted in an organic solvent solution in the presence of a catalytically effective amount of a Lewis acid catalyst. The selected solvent should have a boiling point of at least about 60°C. and can include benzene, chloroform, tetrachloroethane and preferably carbon tetrachloride. Suitable Lewis acid catalysts include aluminum trichloride, magnesium chloride and, preferably, titanium tetrachloride. In most instances, the catalyst should be present in the system in a concentration of from about 0.1–1.0 percent, as based on the total weight of both reactants, i.e., the weight of the halomethyl- or phenylphosphonic dichloride and the 2,3-dibromopropanol.

The reaction is conducted by heating the organic solvent solution containing the two reactants and the selected catalyst at a temperature in the range of from about 40°–100° C., preferably at about 80° C., in order to evolve the first equivalent of the hydrogen chloride by-product. The solution is then refluxed at the boiling point of the solvent in order to evolve the second equivalent of hydrogen chloride. The reaction periods required to evolve each equivalent of hydrogen chloride are approximately equal to one another with the overall reaction period ranging from about 2 to 24 hours depending upon the amounts of the reagents which are employed. The use of this process is preferred over the process of Route No. 2 because it produces the compounds of this invention in higher yields and is also more economical.

In conducting the process outlined, hereinabove, in the equation set forth for synthetic route No. 2, the diallyl phosphonate intermediate is first prepared by means of a well known reaction which involves the addition of either phenylphosphonic dichloride or a halomethylphosphonic dichloride, e.g., chloromethylphosphonic dichloride, to double its concentration, on a molar basis, of allyl alcohol and triethylamine. This reaction is conducted at a temperature in the range of from 0° to 5° C. The triethylammonium chloride by-product is then removed by being dissolved in water and washed with aqueous sodium bicarbonate. The organic layer is next separated and dried with a dessicant such as magnesium sulfate. Finally, after removal of solvent by distillation the dially halomethyl or phenylphosphonate is recovered from the reaction mixture. It can then be purified by further distillation.

The thus prepared diallyl halomethyl- or phenylphosphonate intermediate is then dissolved in a chlorinated hydrocarbon solvent such, for example, as methylene chloride, chloroform or tetrachloroethane with carbon tetrachloride being preferred. To this solution, there is then slowly added a solution of bromine in a chlorinated hydrocarbon solvent with the use of carbon tetrachloride again being preferred. The bromine should be used in an amount which is twice that, on a molar basis, of the concentration of the diallyl halomethyl- or phenylphosphonate intermediate. The ensuing reaction is slightly exothermic. Upon the completion of the reaction, the organic layer is dried, filtered and the solvent removed under vacuum so as to yield the desired bis(2,3-dibromopropyl) halomethyl- or phenylphosphonate. As prepared by means of either of the above described synthetic routes, the bis(2,3-dibromopropyl) halomethyl- or phenylphosphonate is a mixture of crystalline and liquid optical isomers.

It is to be noted, at this point, that the preparation of a compound closely related to the phosphonates of this invention, namely bis(2,3-dibromopropyl) azirydinylphosphonate, i.e.,

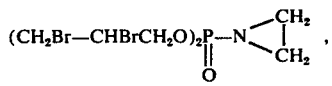

is also being contemplated at this time. Thus, it is hoped to be able to prepare this compound by means of the reaction, catalyzed by triethylamine, between ethylenimine and 2,3-dibromopropyl phosphoryl chloride which also yields triethylamine hydrochloride as a by-product.

As has been noted, the novel compounds resulting from the process of this invention provide excellent flame retardant properties upon being intimately admixed with a large number of polymeric substrates which are ordinarily highly flammable. Thus, these compounds have been found to be particularly suitable in preparing flame retardant polyester resins. The latter class of resins generally comprise the products made by heating a mixture of glycols, e.g., propylene or diethylene glycol, unsaturated dibasic acids or anhydrides, e.g., fumaric acid or anhydrides, e.g., fumaric or maleic anhydride, and, optionally, a saturated dibasic acid or anhydride, e.g., isophthalic, phthalic, chlorendic, tetrabromophthalic and tetrachlorophthalic acids and their respective anhydrides, which serves to control the reaction and modify the properties of the resulting product. To the thus prepared fluid polyester, a reactive monomer, e.g., styrene, diallyl phthalate, diallyl isophthalate or triallyl cyanurate, is then usually added and a peroxide catalyst, e.g., benzoyl peroxide, is introduced in order to catalyze the final copolymerization reaction. These polyesters, or unsaturated polyesters as they are often referred to, are thermosetting and are widely used in reinforced plastics and in the potting of electrical components. Thus, the novel compounds of the invention are also particularly well suited to provide excellent flame-retardant properties to these unsaturated polyester resins, reinforced, for example, with fibrous glass mat, glass cloth, woven roving chopped roving, paper, asbestos, textiles, and the like.

The bis(2,3-dibromopropyl) halomethyl- or phenylphosphonate of this invention can also be used to flame retard urethane resins which may be rigid, flexible or foamed. These polymers are ordinarily prepared by means of the reaction between an isocyanate, such as toluene diisocyanate or diphenylmethane-4,4'diisocyanate, and a second reagent comprising a polyol which contains two or more hydroxyl groups. As used in this specification, the term "isocyanate material" is intended to include any polyisocyanate or urethane compounds containing two or more unreacted —NCO radicals. The most common urethane resins are formed by reaction of toluene diisocyanate and a polyether or polyester polyol. Representative polyesters are the reaction products of adipic acid and/or phthalic anhydride and ethylene glycol. Other polyols which may be used in place of the polyesters are polyethers, such as the polyoxypropylenediols and polyoxypropylene triols, castor oil, methyl glucoside polyether polyols and drying oils, etc.

Urethane foams differ from other cellular plastics in that the chemical reactions causing foaming occur simultaneously with the polymer-forming reactions. As in the case of urethane resins, the polymeric constituent of urethane foams is made by reacting a polyol with an isocyanate. When the isocyanate is in excess of the amount that will react with the polyol, and when water is present, the excess isocyanate will react with water to produce carbon dioxide which expands the mixture. Urethane foams may be flexible or rigid and may have open or closed cells, depending largely on the polyol used. Crosslinked foams are rigid or semi-rigid. Auxiliarly Auxiliary or foaming agents, such as the various halohydrocarbons, are sometimes used, especially in rigid foams. Other ingredients often incorporated in urethane foams are catalysts to control the speed of reaction, and a surfactant to stabilize the rising foam and control cell size.

Three basic processes are used for making urethane foams: the propolymer technique, the semi-prepolymer technique and the one-shot process. In the prepolymer technique, a polyol and an isocyanate are reacted to produce a compound which may be stored and subsequently mixed with water, catalyst and, in some cases, a foam stabilizer. In the semi-prepolymer process, about 20 percent of the polyol is prereacted with all of the isocyanate and this product is later reacted with a masterbatch containing the remainder of the ingredients. And, in the oneshot process, an isocyanate, a polyol and catalyst are fed into separate streams to a mixing head from which the mixed reactants are discharged into a mold.

Regardless of the procedure utilized for their preparation, polyurethane foams are enjoying ever increasing utilization in a wide variety of applications including their use in household appliances, airplane construction, padding for mattresses and upholstery, interlinings or overcoats and sleeping bags, soundproof walls, insulation against heat loss, life preservers, fish net floats, foam rubber specialties, air filters, packaging and bone surgery.

Other polymeric substrates with which the novel compounds of this invention can be admixed in order to provide flame retardant blends include but are not limited to:

Polymers of nitriles of ethylenically unsaturated acids including polymethacrylonitrile, polyacrylonitrile and the copolymers of methacrylonitrile or acrylonitrile with a minor proportion of one or more vinyl monomers such as the lower alkyl acrylates and methacrylates, styrene and alphamethyl styrene;

Polymers of methyl methacrylate including polymethylmethacrylate and the copolymers of methyl methacrylate with minor proportions of one or more alpha, beta-ethylenically unsaturated monomers which are polymerizable therewith including the $C_1$–$C_8$ alkyl, cycloalkyl and bicycloalkyl esters of acrylic acid and the $C_2$–$C_8$ alkyl, cycloakyl and bicycloalkyl esters of methacrylic acid such, for example, as ethyl acrylate and methacrylate, butyl methacrylate, 2-ethylhexyl methacrylate, norbornyl acrylate, and cyclohexyl acrylate; vinyl aryl compounds such, for example, as alphamethyl sytrene and styrene; and, nitriles of alpha, beta-ethylenically unsaturated carboxylic acids such, for example, as acrylonitrile and methacrylonitrile;

Acrylonitrile-butadiene-styrene resins, commonly referred to as "ABS" resins, which generally comprise either a mixture of a 60 to 80:40 to 20 styrene:acrylonitrile copolymer with from about 10 to 40 percent, by weight of a 5 to 40:95 to 60 acrylonitrile-butadiene copolymer or a mixture of a 60 to 80:40 to 20 styrene-acrylonitrile copolymer with from about 10 to 40 percent, by weight, of a graft of the latter copolymer onto polybutadiene;

Poly(alpha-olefins) such as polyproplene and polyethylene and copolymers of one or more alpha-olefins, such as ethylene or propylene, with a minor proportion of one or more ethylenically unsaturated monomers including 4-methyl pentene-1, butene-1, norbornene and its derivatives, cyclopentadiene, cyclopentene, cyclobutene, vinyl acetate, the $C_1$–$C_{12}$ alkyl acrylate and methacrylate esters, as well as blends of the homo- and copolymers of alpha-olefins with other types of thermoplastic polymers;

Polymers of styrene including polystyrene, poly(alphamethyl styrene) and poly(tertiary butyl styrene) and copolymers of styrene, alpha methyl styrene or tertiary butyl styrene with a minor proportion of one or more ethylenically unsaturated comonomers such, for example, as nitriles of ethylenically unsaturated carboxylic acids including acrylonitrile and methacrylonitrile; $C_1$–$C_{12}$ alkyl esters of acrylic and methacrylic acids such, for example, as methyl methacrylate and 2-ethylhexyl acrylate; and, graft copolymers of styrene, tertiary butyl styrene or alpha-methyl styrene with polybutadiene and other hydrocarbon elastomers;

Cellulosic resins including cellulose esters and mixed esters such, for example, as cellulose nitrate, cellulose acetate-butyrate, cellulose acetate-propionate and cellulose ethers such, for example, as ethyl cellulose;

Polyamide resins, i.e. the resins made by the condensation of di- or polyamines with di- or polybasic acids or by polymerization of lactams or amino acids. Typical polyamides include nylon 4 which is made from pyrrolidone; nylon 6 obtained by polycondensation of caprolactam; nylon 66 obtained by the condensation of hexamethylene diamine with adipic acid; nylon 610 obtained by the condensation of hexamethylenediamine with sebacic acid; nylon 7 which is a polymer of ethyl aminoheptanoate; nylon 9 made from 9-aminononanoic acid; and, nylon 11 made from 11-amino undecanoic acid;

Polycarbonate resins, i.e. the resins derived from the reaction between a difunctional alcohol or phenol, such as bisphenol A, and phosgene or an alkyl or aryl carbonate;

Polyacetal resins, i.e., the resins derived from the anionic polymerization of formaldehyde to obtain a linear molecule of the type —O—$CH_2$—O—$CH_2$—O—$CH_2$;

Polyphenylene oxide resins made by the oxidative polymerization of 2,6-dimethylphenol in the presence of a copper amine complex catalyst;

Polysulfone resins, i.e., the resins containing an $SO_2$ linkage as derived from the reaction of sulfur dioxide with olefins such as 1-butene or, more preferably, by reaction of bisphenol A with 4,4'-dichlorodiphenyl sulfone;

The acrylate:styrene:acrylonitrile resins, commonly referred to as "ASA" resins, which comprise copolymers containing a major proportion of a $C_2$–$C_8$ alkyl acrylate ester elastomer upon which is grafted about 65–95 percent, by weight of the latter copolymer, of a 70–80:30–20 sytrene:acrylonitrile copolymer; and, the Methacrylate:butadiene:styrene resins, commonly referred to as the "MBS" resins, which comprise a minor proportion of a methyl methacrylate:styrene:acrylonitrile terpolymer grafted and/or blended with either polybutadiene or a copolymer of butadiene and minor proportions of such comonomers as, for example, styrene and acrylonitrile.

In all cases, the novel compounds of this invention have been found to provide blends with polymeric substrates which are characterized by their outstanding fire retardancy and their ease of blending. As used in this disclosure, the term "fire retardant" or "flame retardant" is intended to refer to that particular property of a material which provides it with a degree of resistance to ignition and burning. Thus, a fire or flame retardant composition is one which has a low level of flammability and flame spread.

The actual blending of the bis-(2,3-dibromopropyl) halomethyl- and phenylphosphonates of this invention with the selected polymeric substrate, i.e., with any one or more of the above described polymers, may be accomplished by means of any convenient procedure which will result in an intimate admixture of the additive compound, or compounds, within the mass of the substrate polymer. Thus, it may be included in the reaction mixture used to cure or polymerize the polymer or it may be blended with a previously prepared polymer.

With respect to proportions, the amount of the novel compounds of this invention which may be admixed with a polymer substrate which is being utilized, the degree of fire retardancy desired in the resulting blend, the specific physical properties which are sought as well as other technical and economic considerations known and understood by those skilled in the art. However, in order to attain a composition which will be self-extinguishing, it is generally desirable to introduce an effective concentration of one or more of these novel compounds which will be sufficient to provide the resulting blend with at least about 1 percent, by weight, of phosphorus. Thus, depending upon the various factors which have been set forth hereinabove, the blends containing the novel compounds of this invention can contain from about 5 to 30 percent, by weight, of one or more of these bis(2,3-dibromopropyl) halomethyl- or phenylphosphonates.

The resulting blends may also contain stabilizers, plasticizers, fillers, pigments, dyes, opacifying agents, decorative additives such as reflective metal foils or flakes, and other imbedded solid objects such as fiber glass, textile fibers, asbestos, paper, and the like, provided that they do not detract from the flame retardancy of these products. In addition, the compositions may contain other flame retardants such as antimony compounds, chlorinated paraffins, perchlorinated alicyclic compounds, bromine containing organic compounds, halogenated alkyl phosphates or phosphonates, allkyl acid phosphates, or small concentrations of phosphoric acid.

The novel blends of this invention, comprising blends of any of the above described polymers with one or more of the novel compounds of this invention, may be utilized in any of the coating, molding, adhesive impregnating, laminating and foaming applications known to those skilled in the art wherein it is desired to provide fire retardancy to the resulting end product. These fire retardant blends may, therefore, be used as coatings, impregnants, fillers, laminants, and adhesives, etc. for such substrates as wood; paper; metals; textiles based on either natural or synthetic fibers or blends thereof; synthetic polymer films such as those based upon polyolefins, regenerated cellose, i.e. cellophane, polyvinyl chloride, polyesters and the like; leather; natural and synthetic rubber; fiberboard; and, synthetic plastics prepared by means of either addition or condensation polymerization techniques.

With respect to the use of bis(2,3-dibromopropyl) chloromethylphosphonate as a flame retardant additive, it is to be noted that, inasmuch as its chloromethyl group is bonded directly to the P=O group, the chlorine atom in its chloromethyl group will be highly reactive. By virtue of its high degree of reactivity this chlorine atom can readily alkylate cellulosic fabrics and other cellulosic substrates so as to result in its permanent incorporation into the cellulosic substrate thereby significantly enhancing the durability of the resulting fire retardant finish.

The following examples will further illustrate the embodiment of this invention. In these examples, all parts given are by weight unless otherwise noted.

EXAMPLE I

This example illustrates the preparation of bis(2,3-dibromopropyl) chloromethylphosphonate by means of a process involving the reaction between 2,3-dibromopropanol and chloromethylphosphonic dichloride.

A three-neck flask fitted with water condenser, thermometer and gas inlet-outlet adapters is charged with 2,3-dibromopropanol (176.3 gms., 0.81 moles), chloromethylphosphonic dichloride (66.5 gms., 0.40 moles), 200 ml carbon tetrachloride and 0.10 ml of titanium chloride catalyst. The reactants are first heated at 40° C. for one hour and then at 80° C. for an additional two hours. During this period, one equivalent of HCl is evolved and displaced from the reaction vessel into a water reservoir. Thereafter, during the course of an additional four hours of heating at 80° C., the second equivalent of HCl is evolved. Upon cooling, the resulting light yellow liquid is washed with two portions, totaling 400 ml, of a 20 percent, by wt., aqueous $NaHCO_3$ solution and then with 400 ml. of water. The organic layer is next separated and dried over anhydrous magnesium sulfate. After removal of the drying agent by filtration, the carbon tetrachloride is removed in vacuo yielding a milky white liquid (213.5 gms, 97 percent yield) whose refractive index is $n_D^{25} = 1.5625$ and whose acid number =2.80 mg. KOH/gm sample. Infra-red analysis indicates only a trace of residual 2,3-dibromopropanol and is consistant with the proposed product structure.

Upon standing several days at room temperature, extensive crystallization of the white liquid has begun. Since each dibromopropyl radical incorporates a chiral carbon atom, the crystalline portion of the product is believed to be one of the optical isomers of bis(2,3-dibromopropyl) chloromethylphosphonate, most probably the meso modification. Analogously, the liquid portion of the product most probably represents the dl racemic modification of this phosphonate. The crystalline isomer was recrystallized from iso-propanol to give white needles having a melting point of 68°–69° C.; i.e., nuclear magnetic resonance, $(CCl_4)\tau 5.9–5.3$ (6H, multiplet, $PCH_2 + POCH_2$) and $\tau 6.5–6.0$ (6H, multiplet, $CH_2BrCHBr$); Observed %C 15.85, %H 2.09, %P 5.93 — calculated %C 15.82, %H 2.26, %P 5.80.

In a repetition of the above described preparative procedure, bis(2,3-dibromopropyl) bromomethylphosphonate was prepared by substituting an equivalent amount of bromomethylphosphonic dichloride for the chloromethylphosphonic dichloride.

EXAMPLE II

This example illustrates the preparation of bis(2,3-dibromopropyl) chloromethylphosphonate by means of a process involving the reaction between bromine and diallyl chloromethylphosphonate.

The diallyl chloromethylphosphonate is first prepared by introducing 250 ml. benzene, triethylamine (85 gms., 0.8 moles) and allyl alcohol (48.7 gms., 0.8 moles + 5%) into a reaction vessel. The contents of the vessel are stirred and then cooled to 0° C. Chloromethylphosphonic dichloride (67 gms., 0.4 moles) is then slowly added over a period of 75 minutes while maintaining the temperature within 0° ± 5° C. The resulting slurry is stirred for 45 minutes in an ice bath. To this slurry there is then added 250 ml. of ice water in order to dissolve the triethylamine hydrochloride precipitate. The benzene solution containing the product is washed with 125 ml. of a cold 5 percent, by weight, aqueous $NaHCO_3$ solution and then with 125 ml. of a cold 5 percent, by weight, aqueous NaCl solution whereupon it is concentrated by distillation over copper resinate. The resulting product is distilled in an oil bath yielding 46.0 gms. (57% yield) boiling point = 86°–88° C/O. 45 mm.; $n_D^{25} = 1.4674$.

In a flask, 14.9 gms. (0.050 moles) of the thus prepared diallyl chloromethyl phosphonate is dissolved in 100 ml. of carbon tetrachloride. To the resulting solution, there is then added a solution of 16.0 gms. (0.010 moles) of bromine in 50 ml. of carbon tetrachloride. A slight exothermic reaction is noted. After the addition of the bromine is completed, the carbon tetrachloride solution is washed with 100 ml. of a 5% aqueous sodium bicarbonate solution and then with 100 ml. water. The organic layer is dried over anhydrous magnesium sulfate, filtered and the solvent removed in vacuo. The product (27.1 gms., quantitative yield) displayed an infra-red spectrum and physical constants which are identical with that of the compound derived from the process described in EXAMPLE I hereinabove.

EXAMPLE III

This example illustrates the use of one of the novel compounds of this invention in preparing flame retardant polyester resin compositions.

TABLE I

| Flame Retardant Additive | Polyester Resin System | Glass Reinforced | Ophr | LOI at levels of 5phr | 10phr | 15phr | 20phr | HLT-15[Rating/flame time (sec)] at levels of Ophr | 5phr | 10phr | 15phr |
|---|---|---|---|---|---|---|---|---|---|---|---|
| bis(2,3-dibromopropyl) chloromethyl phosphonate | Hetron 24370 | yes | 28.4 | 33.3 | 38.0 | | | 20/— | 100/68 | 100/55 | |
| | RCI Polylite 31-007 | yes | 19.5 | | 24.0 | 26.1 | 28.1 | 0/— | | 48/— | 84/— |
| | Koplac 1060-5 | no | 17.7 | | 21.8 | | 24.8 | | | | |
| | RCI 34-440 | yes | | | | | | | 100/68 | | |
| | Polymethylmethacrylate | no | 16.9 | | 20.5 | | | | | | |
| tris-(2,3-dibromopropyl) phosphate | Hetron 24370 | yes | 28.4 | 34.3 | 38.2 | | | 20/— | 100/81 | | |
| | RCI Polylite 31-007 | yes | 19.5 | | 23.0 | 25.3 | 25.3 | 0/— | | 24/— | 36/— |
| | Koplac 1060-5 | no | 17.7 | | 21.0 | 22.8 | 24.3 | | | | |
| | Polymethylmethacrylate | no | 16.9 | | 20.4 | | | | | | |

Hetron 24370 - a chlorendic unsaturated polyester made by Hooker Chemical Company.
RCI Polylite 31-007 - a non-halogenated unsaturated polyester made by Reichold Chemicals, Inc.
RCI 34-440 - a tetrabromophthalic unsaturated polyester made by Reichold Chemicals, Inc.
Koplac 1060-5 - a non-halogenated unsaturated polyester made by the Koppers Company, Inc.
phr = parts per hundred resin.

The non-glass reinforced samples in the above TABLE I are rods whose dimensions are 13 mm × 100 mm and are prepared by first intimately admixing the appropriate polyester resin and bis(2,3-dibromopropyl) chloromethylphosphonate, as prepared in EXAMPLE II hereinabove, and a small amount of catalytic benzoyl peroxide. The resulting mixture is then cured in tube shaped molds for one hour at 100° C. and then for an additional 18 hours at 135°–140° C.

The glass reinforced samples are cut from reinforced panels which are prepared from an admixture of the appropriate polyester resin and appropriate amount of bis(2,3-dibromopropyl) chloromethylphosphonate and 30–40% glass consisting of 3 plies glass mat (1½ oz./sq.ft.) sandwiched between 2 plies of glass fabric (10 oz./sq.yd.). After the panels are jelled and firm, they are post cured in an oven at 60° C. for 16 hours before testing.

As controls for this experiment, samples are prepared which, in one instance, are devoid of the novel additive of this invention while another set contain an equivalent amount of tris(2,3-dibromopropyl) phosphate, which is a commercially utilized flame retardant additive, in place of the bis(2,3-dibromopropyl) chloromethylphosphonate.

The flame retardancy of these polyester resin samples is evaluated by means of the Limiting Oxygen Index (LOI) ASTMD-2863 and the Hooker Laboratory Test-15 (HLT-15) methods. The former procedure is described by Fenimore and Martin in the Novemenber, 1966 issue of Modern Plastics, while the latter method is briefly described in Lyons, Chemistry and Uses of Flame Retardants, Wiley Interscience, 1970. In brief, the LOI method directly relates flame retardancy to a measurement of the minimum percentage concentration of oxygen in an oxygen: nitrogen mixture which permits the sample to burn; the LOI being calculated as follows:

$$LOI = \frac{[O_2]}{[O_2] + [N_2]} = 100$$

Thus, a higher LOI is indicative of a higher degree of flame retardancy. The HLT-15 test is conducted in a draft free cabinet on 8 × ½ × ⅛ inch samples suspended vertically from the top. A bunsen burner flame 5 inches long with a 1½ inch long inner blue cone is inclined at an angle at 20° from the vertical so that the blue cone just touches the bottom tip of the sample. Five specimens of each sample are tested to the following schedule.

| Applications | On Time (seconds) | Off Time (seconds) |
|---|---|---|
| 1 | 5 | 10 |
| 2 | 7 | 14 |
| 3 | 10 | 20 |
| 4 | 15 | 30 |
| 5 | 25 | 50 |

A rating of 4 is assigned each time a sample extinguishes during the off time. A rating of 0 is assigned and testing ended on a specimen if it continues to burn beyond the allotted time. Should all five samples pass the applications, a rating of 100 is attained. The elapsed burning times are then summed in order to establish an additional rating, i.e., flame-time, of the sample. Thus, a higher rating and lower flame-time are indicative of superior flame-retardancy.

The above data in TABLE I reveal that bis(2,3-dibromopropyl) chloromethylphosphonate provides excellent results when used as a flame retardant additive for polyester resins; these results being better than those achieved with a commercially available phosphate additive. Moreover, the novel phosphonate compounds of this invention display a degree of hydrolytic stability which is believed to be superior to that found in these commercially available phosphate ester additives.

EXAMPLE IV

This example illustrates the preparation of bis(2,3-dibromopropyl) phenylphosphonate by means of the reaction between 2,3-dibromopropanol and phenylphosphonic dichloride.

To a reaction vessel containing freshly distilled 2,3-dibromopropanol (56.9 gms., 0.26 moles) dissolved in 150 ml. of carbon tetrachloride and 0.5 gms. of anhydrous magnesium chloride, there is added a solution of phenylphosphonic dichloride (25.4 gms., 0.13 moles) in 50 ml. of carbon tetrachloride. No reaction is observed at room temperature (~25° C.) but, upon being heated to reflux temperature (80° C.), HCl is evolved at a moderately efficient rate. Infra-red analysis of aliquots reveals that the reaction is about 80 percent complete after 4 hours and virtually 100 percent complete after 20 hours.

The resulting clear, water-white solution is washed twice with 250 ml. of a 5 percent, by weight, aqueous NaHCO₃ solution and then twice with 250 ml. of water. The organic layer is separated and dried over anhydrous magnesium sulfate and the solvent is stripped in vacuo yielding a white liquid (53 gms., 73 percent yield). Analysis is as follows:

nmr (CCl₄):
  τ 1.8–2.7 (5H, multiplet, phenyl)
  τ 5.3–5.8 (6H, multiplet, CH₂BrCHBr)
  τ 6.2 (4H, Broad Singlet, —CH₂O—)
Infra-red (Neat):
  3090, 3060 and 3040 cm⁻¹ } phenyl
  1580 cm⁻¹
  1252 cm⁻¹ (P→O)
  1160, 1035 and 990 cm⁻¹ (P—O—C)
Elemental Analysis:

|     | Theoretical | Observed |
| --- | --- | --- |
| %P  | 5.5 | 5.0 |
| %Br | 57.3 | 60.1 |

EXAMPLE V

This example illustrates the use of the compound of EXAMPLE IV in preparing flame retardant polyester resin compositions.

TABLE II

| Flame Retardant Additive | Polyester Resin System | Glass Re-inforced | LOI at levels of 0phr | LOI at levels of 10phr | HLT-15 at level of 5phr |
| --- | --- | --- | --- | --- | --- |
| bis(2,3-dibromopropyl) phenylphosphonate | Hetron 24370 | yes |  |  | 100/114 |
|  | Koplac 1060-5 | no | 17.7 | 21.1 |  |
| tris(2,3-dibromopropyl) phosphate | Hetron 24370 | yes |  |  | 100/81 |
|  | Koplac 1060-5 | no | 17.7 | 21.0 |  |

The test samples of TABLE II are prepared similarly to those of TABLE I. Moreover, the data in TABLE II reveal the excellent results obtained upon using bis(2,3-dibromopropyl) phenylphosphonate as a flame retardant additive for polyester resins.

EXAMPLE VI

This example illustrates the use of one of the novel compounds of this invention in preparing a flame retardant urethane foam.

A number of different polyurethane foams are prepared by admixing their respective ingredients in the sequence in which they are listed in the following table and pouring each of the resultant mixtures into an 8 inch square box.

In carrying out this procedure, all of the ingredients, with the exception of the TDI, i.e., the toluene diisocyanate, are thoroughly admixed with one another, whereupon the TDI is introduced thereby initiating the foam forming reaction. In each case, the TDI index of the resulting foams is 108, the latter factor being computed as follows:

TDI Index = Equivalents of —NCO Groups × 100
  Total equivalents of —OH
  Groups in the polyol, the
  flame retardants and water The degree of flame retardancy of the resulting foams is evaluated by means of the porcedure of ASTM D-1962. This test evaluates the surface flammability of the foams by supporting a 6 × 2 × 0.5 inch foam specimen on a horizontal hardwarecloth with the 0.5 inch dimension vertical and contacting one end for 60 seconds with a 1.5 inch high blue flame from a ⅜ inch diameter barrel bunsen burner fitted with a 1⅞ inch wide wing top. During the course of this test, the burning rate in inches per minutes is measured and it is also noted whether the sample is self-extinguishing, and the time required for it to self-extinguish, or whether it continues to burn until it is completely extinguished. The results of these evaluations are also presented in the following table.

| | PARTS (gms.) | | |
| --- | --- | --- | --- |
| | Control | Foam No. 1 | Foam No. 1 |
| A triol having a molecular weight of 3,000 resulting from the reaction between propylene, oxide and glycerol as sold by Olin Corp. under the trademark "Poly G 3030" | 200.0 | 200.0 | 200.0 |
| Bis(2,3-dibromopropyl) chloromethylphosphonate | — | — | 30.0 |
| Tris(2,3-dibromopropyl) phosphate | — | 30.0 | — |
| Water | 8.0 | 8.0 | 8.0 |
| A silicone surfactant sold by the Union Carbide Corp. as "L-540" | 1.8 | 1.8 | 1.8 |
| N-ethyl morpholine(catalyst) | 0.4 | 0.4 | 0.8 |
| A 67% solution of dimethylaminoethyl ether in dipropylene glycol (catalyst) sold by Union Carbide Corp. as "Niax Catalyst A-1" | 0.35 | 0.35 | 0.35 |
| A 50% solution of stannous octoate in dioctyl phthalate (catalyst) sold by M & T Div. of American Can Co. as "Catalyst T-10" | 0.8 | 0.8 | 0.8 |
| Methylene Chloride (Blowing Agent) | 6.0 | 6.0 | 6.0 |
| An 80:20 mixture of 2,4- and 2,6-toluene diisocyanate (TDI) | 102.3 | 102.3 | 102.3 |
| ASTM D-1692 Results | Continues to burn at 9.0 in./ min. until complete consumed. | Self-extinguishing in 40 sec. after consuming only 3.1 inches. | Self-extinguishing in 25 sec. after consuming only 2.2 inches. |

The above data reveal that bis(2,3-dibromopropyl) chlorommethylphosphonate provides excellent results when used as a flame retardant additive for urethane foams; these results being substantially better than those achieved with tris(2,3-dibromopropyl) phosphate which is a commercially available flame retardant additive.

Variations may be made in proportions, procedures and materials without departing November, the scope of this invention as defined in the following claims.

What is claimed is:

1. A flame retardant composition comprising an intimate admixture of a polymeric substrate and an effective concentration of a bis(2,3-dibromopropyl) phosphonate corresponding to the formula:

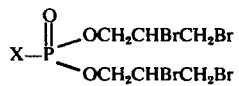

where X is a radical selected from the group consisting of phenyl and Y—CH$_2$— radicals wherein Y is a halo radical selected from the group consisting of chloro and bromo radicals.

2. The composition of claim 1, wherein said polymeric substrate is a polyester resin.

3. The composition of claim 1, wherein said polymeric substrate is a reinforced polyester resin.

4. The composition of claim 1, wherein said polymeric substrate is a urethane foam.

5. The composition of claim 1, wherein said polymeric substrate is polymethylmethacrylate.

6. The composition of claim 1, wherein said bis(2,3-dibromopropyl) phosphonate is a bis(2,3-dibromopropyl) chloromethylphosphonate.

7. The composition of claim 1, wherein said bis(2,3-dibromopropyl) phosphonate is bis(2,3-dibromopropyl) bromomethylphosphonate.

8. The composition of claim 1, wherein said bis(2,3-dibromopropyl) phosphonate is bis(2,3-dibromopropyl) phenylphosphonate.

* * * * *